(12) United States Patent
Jolly et al.

(10) Patent No.: US 10,293,925 B2
(45) Date of Patent: May 21, 2019

(54) SYSTEMS AND METHODS FOR IMPLEMENTING DIRECTIONAL FORCE WEIGHTING WITH CIRCULAR FORCE GENERATORS

(71) Applicants: LORD CORPORATION, Cary, NC (US); Mark R. Jolly, Raleigh, NC (US); Paul R. Black, Fuquay-Varina, NC (US); Doug A. Swanson, Cary, NC (US); Doug G. Pedersen, Apex, NC (US)

(72) Inventors: Mark R. Jolly, Raleigh, NC (US); Paul R. Black, Fuquay-Varina, NC (US); Doug A. Swanson, Cary, NC (US); Doug G. Pedersen, Apex, NC (US)

(73) Assignee: LORD Corporation, Cary, NC (US)

( * ) Notice: Subject to any disclaimer, the term of this patent is extended or adjusted under 35 U.S.C. 154(b) by 303 days.

(21) Appl. No.: 14/759,126

(22) PCT Filed: Jan. 17, 2014

(86) PCT No.: PCT/US2014/011956
§ 371 (c)(1),
(2) Date: Jul. 2, 2015

(87) PCT Pub. No.: WO2014/113619
PCT Pub. Date: Jul. 24, 2014

(65) Prior Publication Data
US 2015/0353191 A1      Dec. 10, 2015

Related U.S. Application Data

(60) Provisional application No. 61/754,234, filed on Jan. 18, 2013.

(51) Int. Cl.
*B64C 27/00*    (2006.01)
*G05D 19/02*    (2006.01)

(52) U.S. Cl.
CPC .......... *B64C 27/001* (2013.01); *G05D 19/02* (2013.01); *B64C 2027/004* (2013.01)

(58) Field of Classification Search
CPC .. B64C 27/001; B64C 2027/004; G05D 19/02
See application file for complete search history.

(56) References Cited

U.S. PATENT DOCUMENTS 5,310,137 A * 5/1994 Yoerkie, Jr. ........... B64C 27/001
                                                   188/379
5,750,897 A * 5/1998 Kato ....................... F16F 15/02
                                                   248/550

(Continued)

FOREIGN PATENT DOCUMENTS

EP         1 400 885      3/2004
WO         00/39480       7/2000

(Continued)

*Primary Examiner* — Timothy D Collins
*Assistant Examiner* — Keith L Dixon

(57) ABSTRACT

Systems, methods, and computer program products for directional force weighting of an active vibration control system involve arranging a plurality of force generators in an array, identifying individual component forces corresponding to force outputs of each of the plurality of force generators, determining a combination of the individual component forces that will produce a desired total force vector, and adjusting the outputs of each of the plurality of force generators such that the combination of the individual component forces are at least substantially similar to the desired force vector.

15 Claims, 4 Drawing Sheets

(56) References Cited

U.S. PATENT DOCUMENTS

| | | | | |
|---|---|---|---|---|
| 6,467,723 | B1 * | 10/2002 | Rossetti | B64C 27/001 244/1 N |
| 6,536,735 | B2 * | 3/2003 | Haga | F16F 15/02 188/267 |
| 6,644,590 | B2 * | 11/2003 | Terpay | B64C 27/001 188/378 |
| 7,017,857 | B2 * | 3/2006 | Hill | G05D 19/02 244/17.13 |
| 7,822,509 | B2 * | 10/2010 | Heiland | G05D 19/02 700/280 |
| 8,267,652 | B2 * | 9/2012 | Jolly | B64C 27/001 415/1 |
| 9,174,739 | B2 * | 11/2015 | Jamshidiat | B64D 11/00 |
| 9,284,048 | B2 * | 3/2016 | Harrigan | B64C 27/001 |
| 9,488,247 | B2 * | 11/2016 | Rijnveld | G05D 19/02 |

FOREIGN PATENT DOCUMENTS

| | | |
|---|---|---|
| WO | 2008/079431 | 7/2008 |
| WO | 2012/021202 | 2/2012 |
| WO | 2012/125924 | 9/2012 |

* cited by examiner $$M1 \begin{bmatrix} F_x \\ F_{z1} \\ F_{z23} \\ M_{23} \end{bmatrix} \rightarrow M2 \begin{bmatrix} 1 & 0 & 0 & 0 \\ 0 & 1 & 0 & 0 \\ 0 & 0 & 0.5 & 0.5 \\ 0 & 0 & 0.5 & -0.5 \end{bmatrix} \rightarrow M3 \begin{bmatrix} F_x \\ F_{z1} \\ F_{z2} \\ F_{z3} \end{bmatrix}$$

$$M1 \begin{bmatrix} F_{ax} \\ F_{ay} \\ F_{bx} \\ F_{by} \\ f_5 \end{bmatrix} = M2 \begin{bmatrix} & & 0 & 0 & 0 \\ [tof] & & 0 & 0 & 0 \\ 0 & 0 & & & 0 \\ 0 & 0 & [tof] & & 0 \\ 0 & 0 & 0 & 0 & 1 \end{bmatrix} M3 \begin{bmatrix} f_1 \\ f_2 \\ f_3 \\ f_4 \\ f_5 \end{bmatrix}$$

$$M1 \begin{bmatrix} F_{ccw1} \\ F_{cw2} \\ F_{cw3} \\ F_{ccw4} \end{bmatrix} \Leftrightarrow M2 \begin{bmatrix} 0.5j & 0 \\ -0.5j & 0 \\ 0 & 0.5j \\ 0 & -0.5j \end{bmatrix} \Leftrightarrow M3 \begin{bmatrix} F_{z1} \\ F_{z2} \end{bmatrix}$$

FIG. 6

$$M1 \begin{bmatrix} F_{c1} \\ F_{c2} \\ F_z \\ F_y \end{bmatrix} \rightarrow M2 \begin{bmatrix} 1 & 0 & 0 & 0 \\ 0 & 1 & 0 & 0 \\ 0 & 0 & 0.5j & 0 \\ 0 & 0 & -0.5j & 0 \\ 0 & 0 & 0 & 0.5 \\ 0 & 0 & 0 & 0.5 \end{bmatrix} \rightarrow M3 \begin{bmatrix} F_{ccw1} \\ F_{cw2} \\ F_{ccw3} \\ F_{cw4} \\ F_{ccw5} \\ F_{cw6} \end{bmatrix}$$

FIG. 7

SYSTEMS AND METHODS FOR IMPLEMENTING DIRECTIONAL FORCE WEIGHTING WITH CIRCULAR FORCE GENERATORS

PRIORITY CLAIM

The present application claims the benefit of U.S. Provisional Patent Application Ser. No. 61/754,234, filed Jan. 18, 2013, the disclosure of which is incorporated herein by reference in its entirety.

TECHNICAL FIELD

The subject matter disclosed herein relates generally to active vibration control systems and methods. More particularly, the subject matter disclosed herein relates to implementation and control schemes for an active vibration control system, such as is used to control vibration in a helicopter.

BACKGROUND

It is sometimes desired to place multiple actuators, such as linear actuators or circular force generators (CFGs), close together at particular locations to increase controllability of certain modes of vibration. When this is done, however, adaptive algorithms that are commonly used to control such modes of vibration (e.g., filtered least mean squares) can have difficulty finding the optimal solution. These difficulties can generally arise either because the algorithm takes a significantly longer path to find the minimal solution (i.e., slow convergence) or because it can have a difficult time finding a unique solution, and it will thus oscillate back and forth looking for the minimum (i.e., poor performance).

As a result, it would be advantageous for systems and methods for controlling multiple actuators to quickly and accurately identify an optimal solution to generate the desired force output from the combined operation of the multiple actuators.

SUMMARY

In accordance with this disclosure, systems, methods, and computer program products for directional force weighting of an active vibration control system are provided. In one aspect, an active vibration control system includes a plurality of force generators arranged in an array, with each of the plurality of force generators being configured to generate individual component force outputs. An even number of the plurality of force generators are arranged in pairs that are placed in close proximity to one another for multi-directional force generation. A controller is configured to individually control each of the plurality of force generators to achieve a combination of the individual component force outputs that produces a desired total force vector.

In another aspect, a method for directional force weighting of an active vibration control system is provided. The method involves arranging a plurality of force generators in an array, identifying individual component forces corresponding to force outputs of each of the plurality of force generators, determining a combination of the individual component forces that will produce a desired total force vector, and adjusting the outputs of each of the plurality of force generators such that the combination of the individual component forces are at least substantially similar to the desired force vector.

Although some of the aspects of the subject matter disclosed herein have been stated hereinabove, and which are achieved in whole or in part by the presently disclosed subject matter, other aspects will become evident as the description proceeds when taken in connection with the accompanying drawings as best described hereinbelow.

BRIEF DESCRIPTION OF THE DRAWINGS

FIG. 3 is an illustration of a mapping matrix used for force mapping according to an embodiment of the presently disclosed subject matter.

FIG. 4 is a schematic view of an arrangement of multiple force generators according to an embodiment of the presently disclosed subject matter.

FIGS. 5 through 7 are illustrations of mapping matrices used for force mapping according to embodiments of the presently disclosed subject matter.

DETAILED DESCRIPTION

Numerous objects and advantages of the subject matter will become apparent as the following detailed description of the preferred embodiments is read in conjunction with the drawings, which illustrate such embodiments.

Figure 1:
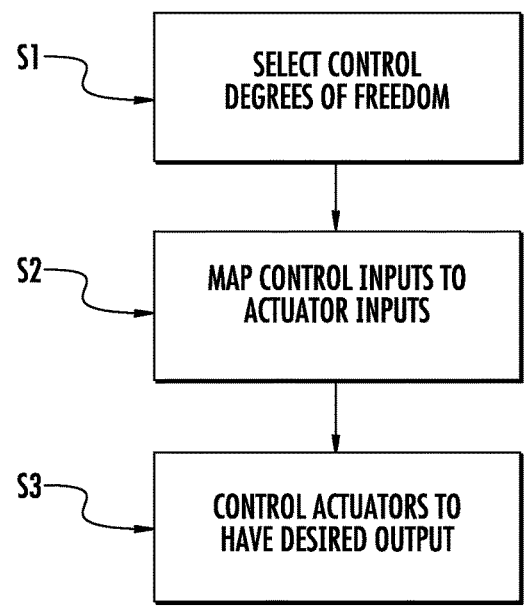
FIG. 1 is a flow chart representing a method of controlling an active vibration control system according to an embodiment of the presently disclosed subject matter.

Actuator mapping is able to transform redundant and/or poorly conditioned degrees of freedom into simpler primary Degrees of Freedom (DOFs) in a very simple way. As shown in FIG. 1, for example, achieving a desired force output from a system of independently-controlled force actuators using this kind of actuator mapping involves a selection step S1 in which the degrees of freedom that are desired for the system to output are selected. A mapping step S2 then maps the desired degrees of freedom to the degrees of freedom that are realizable by the force actuators in the system. Based on this mapping, a control step S3 controls each of the force actuators in the system to achieve the desired output. Furthermore, such actuator mapping is generally applicable to any vibration control system, including linear, circular, or mixed actuation systems.

Figure 2:
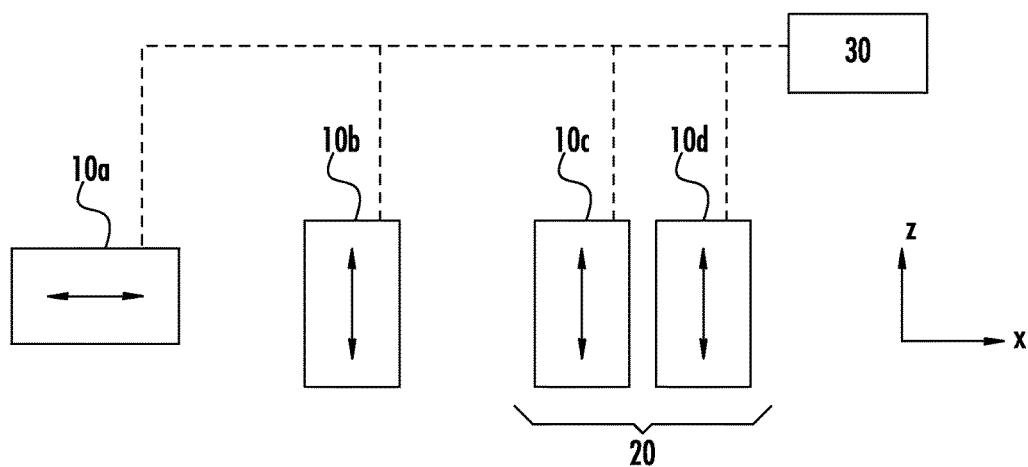
FIG. 2 is a schematic view of an arrangement of multiple force generators according to an embodiment of the presently disclosed subject matter.

In one non-limiting example, a system of linear actuators is controllable to achieve an aggregate force output that includes both linear and rotational modes of vibration. As shown in FIG. 2, for example, a first linear actuator 10a is configured to generate linear vibrations in a first direction (e.g., along an x-axis), and a second linear actuator 10b, a third linear actuator 10c, and a fourth linear actuator 10d are each configured to generate linear vibrations in a second direction that is substantially perpendicular to the first direction (e.g., along a z-axis), with each of the linear actuators being independently controlled by a controller 30. In addition, third linear actuator 10c and fourth linear actuator 10d are positioned near one another such that they are mapped into one or more independent control degrees of freedom as a single paired linear actuator 20 to improve control performance of the system. Furthermore, if resonant actuators are used, the resonant frequency of the coupled actuators can be tuned close to one another, or a phase offset correction can be added. In this way, the controlled actuation of all of the linear actuators enables modes of vibration to be achieved beyond the first and second directions.

To achieve these complex modes of vibration, a transformation matrix is applied to the inputs from each of the linear actuators to achieve a desired output. In general, an active vibration control system operating at a single frequency is described as $$e = Cf + d$$

where e is a [n×1] complex vector of vibration signals at the frequency of interest and measured by the vibration sensors, f is a [m×1] complex vector of input force commands at the frequency of interest, C is the [n×m] complex transfer function matrix between f and e, and d is the n×1 complex vector of vibration signals measured when there is no control. The control system is functional to adapt f such that the product of C and f looks as close to −d as possible such that e is minimal (in a least squares sense).

In this regard, a force transform vector is produced:

$$M1 = M2 M3$$

where an output force vector M1 represents a complex vector with elements for which control weighting is desired, and a transformation matrix M2 maps the natural modes of vibration generated by an input force vector M3 to achieve the desired control weighting.

Figures 3, 4, 5:
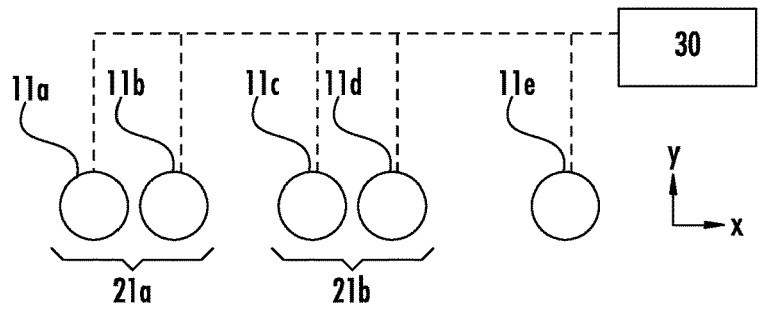

Referring again to the actuator configuration shown in FIG. 2, for example, a control scheme is implemented in one embodiment based on the relationship described above to achieve a complex output force vector M1 as shown in FIG. 3 that is selected to best neutralize the uncontrolled vibration (e.g., the negative of the complex vector of vibration signals d from the relationship discussed above). In this embodiment, output force vector M1 includes vibrations in a first x-direction (e.g., aligned with first linear actuator 10a), a first z-direction (e.g., aligned with second linear actuator 10b), and a second z-direction (e.g., substantially aligned with paired linear actuator 20), as well as generating a rotational mode of vibration (e.g., about paired linear actuator 20). This output is achieved by multiplying transformation matrix M2 (e.g., complex transfer function matrix C from the relationship discussed above) by input force vector M3 (e.g., complex vector of input force commands f from above), where input force vector M3 represents the natural degrees of freedom of each of the linear actuators in the system. In particular, as shown in FIG. 3, input force vector M3 comprises elements representing a first x-direction (e.g., aligned with first linear actuator 10a), a first z-direction (e.g., aligned with second linear actuator 10b), a second z-direction (e.g., aligned with third linear actuator 10c), and a third z-direction (e.g., aligned with fourth linear actuator 10d). By particularly configuring transformation matrix M2, the particular inputs that are needed for each of first, second, third, and fourth linear actuators 10a, 10b, 10c, and 10d (i.e., the values of input force matrix M3) to achieve the resultant mode of vibration defined by output force vector M1 are found.

Similarly, the pairing of proximal circular force generators (CFGs) enables bidirectional force generation. There may be situations where a systems engineer will want to create a single direction force using two CFGs. For example, multiple circular forces can be mapped to independent linear forces (and vice versa). To this end, the vibration control algorithm implicitly will converge to an elliptical resultant force profile for pairs of CFGs such that a weighted sensor set is minimized. The following provides a manner for doing so by penalizing or applying control weighting to various rectilinear directions while maintaining independent CFG control.

For example, as shown in FIG. 4, if a system consists of five CFGs (e.g., a first CFG 11a, a second CFG 11b, a third CFG 11c, a fourth CFG 11d, and a fifth CFG 11e) each being independently controlled by controller 30, the first four CFGs are grouped as a first CFG pair 21a and a second CFG pair 21b, and fifth CFG 10e is unpaired. A goal to minimize the vibration signals (e.g., vector e from the relationship discussed above) is achieved while constraining first CFG pair 21a to produce forces in the x-direction only, constraining second CFG pair 21b to produce forces in the y-direction only, and provide an option to apply a small level of control weighting to fifth CFG 11e.

Again, identifying the proper control weighting for each of the five CFGs in this exemplary configuration is achieved by transforming the input forces generated individually into an aggregate output force vector having the desired modes of vibration. In particular, for example, FIG. 5 provides one generalized implementation of transformation matrix M2 in which a sub-matrix tof converts forces from circular force format to rectilinear force format.

Using this form of force transform, a cost function is defined as follows:

$$J = e^*Qe + F^*RF$$
$$= e^*Qe + f^*\Gamma^*R\Gamma f$$
$$= e^*Qe + f^*\hat{R}f$$

where Q is a sensor weighting matrix and R is a control weighting matrix. With respect to the configuration discussed above with respect to the arrangement shown in FIG. 4, R takes the following form to achieve the control objectives stated above:

$$R = \mathrm{diag}\{0, r_{ax}, r_{by}, 0, r_5\}$$

where $r_{ax}$, $r_{by}$, are adjustable to ensure unidirectionality of first CFG pair 21a and second CFG pair 21b, respectively, and $r_5$ provides control weighting on fifth CFG 11e.

The adaptation algorithm has the following form:

$$f_{k+1} = (I - \hat{R})f_k - \mu C^* Q e_k$$

FIGS. 6 and 7 provide further non-limiting examples of the above principles being applied generally to achieve a desired force output using collocated CFGs. Specifically, FIG. 6 illustrates a configuration of transformation matrix M2 that is configured to map independent linear forces to four circular forces. In this non-limiting example, output force vector M1 contains four circular force outputs to be achieved, and transformation matrix M2 is able to map input force vector M3 to these linear forces from an array of CFGs. Specifically, input force vector M3 represents two linear forces acting in a single linear direction. In addition, those having skill in the art will recognize that transformation matrix M2 is further able to transform four circular forces into two linear forces.

In addition, in the configuration shown in FIG. 7, transformation matrix M2 is designed to transform force inputs from six CFGs (e.g., three clockwise-rotating CFGs and three counter-clockwise-rotating CFGs) into a complex mode of vibration having both circular and linear components. Specifically, the circular force inputs are represented in input force matrix M3 as a first counter-clockwise rotational force $F_{ccw1}$, a first clockwise rotational force $F_{ccw2}$, a second counter-clockwise rotational force $F_{ccw3}$, a second clockwise rotational force $F_{ccw4}$, a third counter-clockwise rotational force $F_{ccw5}$, and a third clockwise rotational force $F_{ccw6}$, and the complex force outputs are represented in output force matrix M1 as a first circular force $F_{c1}$, a second circular force $F_{2c}$, a first linear force $F_z$, and a second linear force $F_y$.

Figure 8:
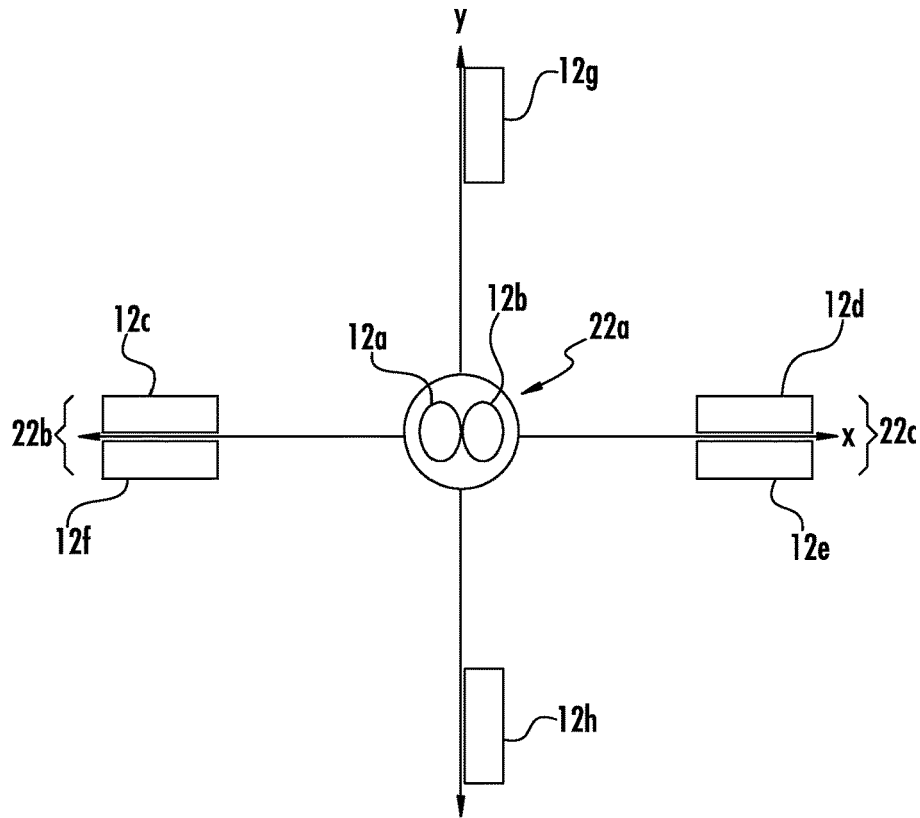
FIG. 8 is a schematic view of an arrangement of multiple force generators according to an embodiment of the presently disclosed subject matter.
Figure 9:
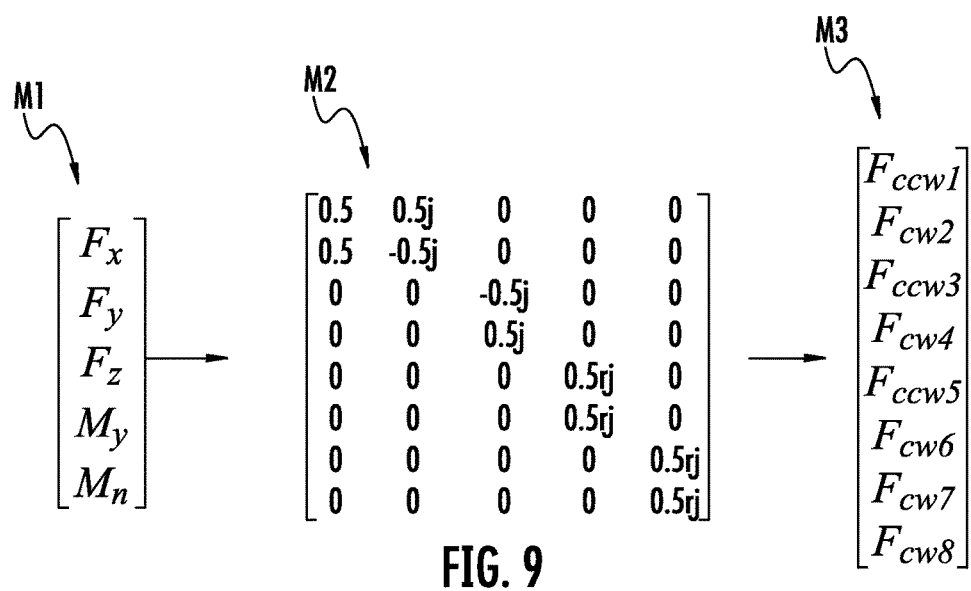
FIG. 9 is a mapping matrix used for linear force mapping according to an embodiment of the presently disclosed subject matter.

In yet a further configuration, actuators are mounted near the transmission of a helicopter to suppress the primary DOFs: X, Y, Z, pitch, and roll. Specifically, as shown in FIG. 8 for example, eight circular force generators are operable to independently control the five primary rigid body DOF's, thereby creating the possibility of a zero-vibration application. In this non-limiting example, a first CFG 12a and a second CFG 12b are arranged substantially in the center of an array as a first CFG pair 22a. In addition, a third CFG 12c and a fourth CFG 12d are each arranged at positions that are spaced apart from first CFG pair 22a on opposing sides of first CFG pair 22a. Similarly, a fifth CFG 12e and a sixth CFG 12f are likewise disposed on opposing sides of first CFG pair 22a, with third CFG 12c and sixth CFG 12f functioning as a second CFG pair 22b and fourth CFG 12d and fifth CFG 12e functioning as a third CFG pair 22c. A seventh CFG 12g and an eighth CFG 12h are arranged at positions that are spaced apart from first CFG pair 22a on opposing sides of first CFG pair 22a and shifted approximately 90° with respect to second CFG pair 22b and third CFG pair 22c.

An exemplary mapping matrix for such a configuration is designed as shown in FIG. 7. As discussed above, the eight CFGs are operable to independently control the five primary rigid body DOFs represented in output force vector M1: a first linear vibrational force $F_x$, a second linear vibrational force $F_y$, a third linear vibrational force $F_z$, a first moment $M_\gamma$, and a second moment $M_\eta$. This control is achieved by applying a configuration of transformation matrix M2 that maps three counter-clockwise rotational forces (i.e., $F_{ccw1}$ of first CFG 12a, $F_{ccw3}$ of third CFG 12c, and $F_{ccw5}$ of fifth CFG 12e) and five clockwise rotational forces (i.e., $F_{cw2}$ of second CFG 12b, $F_{cw4}$ of fourth CFG 12d, $F_{cw6}$ of sixth CFG 12f, $F_{cw7}$ of seventh CFG 12g, and $F_{cw8}$ of eighth CFG 12h) represented in input force matrix M1 to the five primary rigid body DOFs.

In any configuration, if the control authority of a particular DOF is significantly larger or smaller than the others, it can also cause poor transient performance. A simple way to improve this is to normalize the actuator response in the plant model (C-model):

for n=1: nact
nor(n)=C(:,n)'*C(:,n);
Cnor(:,n)=C(:,n)./(nor(n));
end

The present subject matter can be embodied in other forms without departure from the spirit and essential characteristics thereof. The embodiments described therefore are to be considered in all respects as illustrative and not restrictive. Although the present subject matter has been described in terms of certain preferred embodiments, other embodiments that are apparent to those of ordinary skill in the art are also within the scope of the present subject matter.

What is claimed is:

1. An active vibration control system comprising:
a plurality of force generators arranged in an array, wherein the plurality of force generators are placed in close proximity to one another for multi-directional force generation, each of the plurality of force generators being configured to generate an individual component force, the individual component force corresponding to a force output; and
a controller configured to individually control each of the plurality of force generators by applying a force mapping matrix that converts the individual component force to a desired component forces having degrees of freedom corresponding to the desired force vector in order to achieve a combination of the individual component forces that produces a desired total force vector.

2. The active vibration control system of claim 1, wherein the plurality of force generators are arranged near a transmission of a helicopter.

3. The active vibration control system of claim 1, wherein the force generators in each of the pairs are resonant actuators; and wherein the resonant actuators are tuned close to one another or a phase offset correction added.

4. The active vibration control system of claim 1, wherein the plurality of force generators comprise one or more linear actuators, circular force generators, or mixed actuation systems.

5. The active vibration control system of claim 1, wherein the controller is configured to apply a control weighting to one or more of the plurality of force generators such that the individual component forces are at least substantially similar to the desired component forces.

6. The active vibration control system of claim 5, wherein the controller is configured to execute a plant model and thereby normalize a control authority for each of the individual component force outputs.

7. The plurality of force generators are arranged in pairs.

8. A method for directional force weighting of an active vibration control system, comprising:
arranging a plurality of force generators in an array;
for each of the plurality of force generators, identifying individual component forces corresponding to force outputs of each of the plurality of force generators;
determining a combination of the individual component forces that will produce a desired total force vector;
applying a force mapping matrix that converts the individual component force to a desired component force having degrees of freedom corresponding to the desired force vector; and
adjusting the outputs of each of the plurality of force generators such that the combination of the individual component forces are at least substantially similar to the desired force vector.

9. The method according to claim 8, wherein arranging the plurality of force generators comprises arranging an even number of the plurality of force generators in pairs, wherein the force generators in each of the pairs are placed in close proximity to one another for multi-directional force generation.

10. The method according to claim 8, wherein arranging the plurality of force generators comprises arranging the plurality of force generators near a transmission of a helicopter.

11. The method according to claim 8, wherein determining the combination of the individual component forces comprises applying a force mapping matrix that converts the individual component forces to desired component forces having degrees of freedom corresponding to the desired force vector.

12. The method according to claim 11, wherein adjusting the outputs of each of the plurality of force generators comprises applying a control weighting to one or more of the plurality of force generators such that the individual component forces are at least substantially similar to the desired component forces.

13. The method according to claim 12, wherein applying a control weighting comprises normalizing a control authority for each of the individual component forces.

14. The method according to claim 8, wherein adjusting the outputs of each of the plurality of force generators comprises producing the desired force vector to offset a complex vector of vibration signals measured when the plurality of force generators are inactive.

15. The active vibration control system of claim 1, further comprising an even number of the plurality of force generators being placed in close proximity to one another for multi-directional force generation.

* * * * *